(12) United States Patent
Shigemasa et al.

(10) Patent No.: US 6,889,905 B2
(45) Date of Patent: May 10, 2005

(54) ELECTROMAGNETIC COUPLING CHARACTERISTIC ADJUSTMENT METHOD IN NON-CONTACT POWER SUPPLY SYSTEM, POWER SUPPLY DEVICE, AND NON-CONTACT POWER SUPPLY SYSTEM

(75) Inventors: Haruhiko Shigemasa, Yamatokoriyama (JP); Yoshihiro Nakao, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/704,986

(22) Filed: Nov. 12, 2003

(65) Prior Publication Data

US 2004/0095291 A1 May 20, 2004

(30) Foreign Application Priority Data

Nov. 12, 2002 (JP) ........................................ 2002-328836

(51) Int. Cl.[7] .............................................. G06K 19/06
(52) U.S. Cl. ......................... 235/492; 235/380; 455/41
(58) Field of Search ................................ 235/380, 487, 235/492, 493, 494; 343/741, 742, 866, 867, 895; 455/39, 41, 343

(56) References Cited

U.S. PATENT DOCUMENTS

| | | | | |
|---|---|---|---|---|
| 5,220,158 A | * | 6/1993 | Takahira et al. | ............ 235/492 |
| 5,326,965 A | * | 7/1994 | Inoue | ......................... 235/492 |
| 5,664,157 A | * | 9/1997 | Takahira et al. | ............... 703/23 |
| 5,698,838 A | * | 12/1997 | Yamaguchi | .................. 235/492 |
| 6,021,951 A | * | 2/2000 | Nishikawa | ................... 235/494 |
| 6,079,622 A | * | 6/2000 | Goto | ........................... 235/492 |
| 6,427,065 B1 | | 7/2002 | Suga et al. | |
| 2002/0096568 A1 | | 7/2002 | Arisawa | |

FOREIGN PATENT DOCUMENTS

| | | |
|---|---|---|
| EP | 0 722 094 A1 | 7/1996 |
| JP | 11-338983 | 12/1999 |
| WO | WO 99/43096 | 8/1999 |
| WO | WO 02/27650 A1 | 4/2002 |

* cited by examiner

*Primary Examiner*—Tho Phan
(74) *Attorney, Agent, or Firm*—Harness, Dickey & Pierce P.L.C.

(57) ABSTRACT

An electromagnetic coupling characteristic adjustment method for adjusting an electromagnetic coupling characteristic between a reader/writer device and an IC card which are used in a non-contact communication system in which a power transmission antenna coil provided in the reader/writer device and a power receiving antenna coil provided in the IC card are electromagnetically coupled so that the reader/writer device supplies power to the IC card without contact with the IC card. The power supply device includes adjustment impedance elements respectively connected in series and in parallel with the power transmission antenna coil. Impedances of these adjustment impedance elements are determined so that the semiconductor device receives greatest power when a power supply distance, which is a distance between the power transmission antenna coil and the power receiving antenna coil, has a predetermined value not less than 0. On this account, heat generation due to the difference of received power can be reduced with a simple structure.

22 Claims, 7 Drawing Sheets

ELECTROMAGNETIC COUPLING CHARACTERISTIC ADJUSTMENT METHOD IN NON-CONTACT POWER SUPPLY SYSTEM, POWER SUPPLY DEVICE, AND NON-CONTACT POWER SUPPLY SYSTEM

FIELD OF THE INVENTION

The present invention relates to a non-contact power supply system, which includes a semiconductor device such as an IC card and a power supply device for supplying power to the semiconductor device through electromagnetic coupling without contact with the semiconductor, and the power supply system used in the system, and further relates to an electromagnetic coupling characteristic adjustment method for the non-contact power supply system.

BACKGROUND OF THE INVENTION

In recent years, an IC card has come into wide use, which is made of a plastic card containing such as an IC chip of a non-volatile memory, a CPU (Central Processing Unit) etc. The IC card is more advantageous in terms of handling of large amount of data, security, etc. than a magnetic card, which has been commonly used. With such advantages, much attention is now focused on an IC card as a new type card for the next generation.

The reason for rapid widespread of an IC card is compatibility with various applications. The IC card can carry out not only applications currently enforced by a magnetic card, but also applications which cannot be enforced by a magnetic card due to technical limit. Also, there has been expectation for a multi-purpose IC card capable of having plural applications in a single card.

The IC card uses a reader/writer device for power supply and writing of information. The IC card and the reader/writer device fall into contact-type and non-contact-type depending on their interfaces.

In case of contact-type, each of the IC card and the reader-writer device includes a metal connection terminal, and data exchange is performed by bringing the connection terminal of the IC card into contact with the connection terminal of the reader/writer device. Bringing the respective connection terminals into contact also enables power supply from the reader/writer device to the IC card.

In case of non-contact type, each of the IC card and the reader-writer device includes an antenna coil. The antenna coil of the reader-writer device generates a variable electric field, and the antenna coil of the IC card enters the generated variable electric field so as to allow the reader-writer device to supply power to the IC card by electromagnetic induction technology and also allow data transmission between the reader-writer device and the IC card.

The non-contact-type IC card rectifies an induced voltage generated in the antenna coil at a diode bridge before supplying the voltage to respective function blocks. Note that, in this manner, propagation between the antenna coil of the non-contact reader/writer device and the antenna coil of the non-contact IC card is carried out with an electromagnetic wave having a carrier frequency of in a range from several MHz to several 10 MHz, for example.

The non-contact IC card does not include a connection terminal for an external device, and therefore no concern is necessary for breakage of connection portion or the like. Further, the non-contact IC card is capable of power supply and data exchange with respect to the non-contact reader-writer device by only coming closer to the non-contact reader-writer device. Accordingly, the non-contact IC card is advantageous in terms of reduction of maintenance cost, easy handling, high-speed processing etc.

The non-contact reader/writer device falls roughly into two structures depending on whether or not the device has a function for fixing the non-contact IC card. The former is referred to as a close-type, while the latter is referred to as an open-type.

The communication distance between the close-type reader/writer device and IC card is not more than 5 mm, and is often 1 mm. Such a short distance of the close-type reader/writer device and IC card appeals to financial fields in which security of information plays an important role. For this reason, a conventional market has a stronger demand for a close-type reader/writer device than an open-type device.

However, in recent years, the IC card is more often used in traffic fields and also as a system for supervising entry/leaving of a room, and therefore, demand for the open-type with superior convenience increased to be greater than that for the close-type. One example can be a train ticket or a bus ticket made of an IC card, which is used by being held up by the user toward a ticket gate having an open-type reader/writer device, so as to allow the device to carry out data processing with the IC card ("hold up" data processing). Otherwise, the IC card is instantaneously brought into contact with the ticket gate ("touch and go" data processing).

However, the communication distance between the open-type reader/writer device and IC card is not fixed, thus arising a problem when power supply is carried out from the reader/writer device to the IC card. FIG. 8 shows a relation between the communication distance from an open-type reader/writer device to an IC card, and power received by the IC card, when the power supply of the open-type reader/writer device is fixed. As can be seen in the figure, the power received by the IC card becomes maximum when the communication distance is 0, and then gradually decreases as the communication distance increases.

Therefore, within an assumed range of communication distance, an IC card closer to the reader/writer device receives more power. The difference of received power is converted into heat, thus causing heat generation of the IC card when the card is placed close to the reader/writer device for a long time.

Further, to meet the expectation for a multi-purpose IC card, the power from the reader/writer device has to be increased, since the multi-purpose card requires a larger minimum voltage for driving than that of a conventional card due to its non-volatile memory of not less than 1 MB consuming great power.

FIG. 9 shows a relation between the communication distance and the received power by the IC card when more power is supplied from the open-type reader/writer device. As can be seen in the figure, the received power can be increased by supplying larger power if the communication distance between the IC card and the reader/writer device is fixed.

However, larger power supply causes an increase of power difference of the received power between respective communication distances. Further, an excessive increase of the power supply may cause an adverse effect on other devices. Thus, in view of realizing the multi-purpose IC card, it is required to reduce the heat generation caused by the received power difference.

Further, a recent demand for the IC card is a longer communication distance so as to realize superior convenience. However, to increase the communication distance, it is necessary to raise power supply from the reader/writer device as shown in FIG. 9, and therefore the same problem as above occurs.

In view of the problem of heat generation, one solution example can be found in Japanese Laid-Open Patent Application Tokukaihei 11-338983/1999 (published on Dec. 10, 1999), in which power supply from the reader/writer device is adjusted according to the communication distance between the reader/writer device and the IC card. FIG. 7 shows an arrangement example of the reader/writer device and the IC card disclosed in the foregoing publication. In the figure, the left side of the broken line shows an arrangement example of a reader/writer device 100 and the right side shows an arrangement example of an IC card 101.

The reader/writer device 100 includes an oscillator 110, a power control circuit 111, an amplifier 112, a matching circuit 113, a voltage detection circuit 114, a reader/writer IC 115, a tuning capacitor 116, and an antenna coil 117. The oscillator 110 outputs a high frequency wave, which is amplified through the amplifier 112, so as to be supplied to the antenna coil 117 via the matching circuit 113. The antenna coil 117 is directly connected to the tuning capacitor 116 so as to increase transmission efficiency. Note that, in the circuit diagram of FIG. 7, the antenna coil 117 is made up of an inductance component L1 and a resistance component R1.

The IC card 101 includes an antenna coil 120, a tuning capacitor 121, a rectification circuit section 122, and an IC card logic section 123. The tuning capacitor 121 is connected in parallel with the antenna coil 120 as with the tuning capacitor 116 connected to the reader writer device 100, so as to increase transmission efficiency sympathetically with a self-inductance L2 of the antenna coil 120. Electromagnetic coupling of the antenna coil 120 of the IC card 101 and the antenna coil 117 of the reader/writer device 100 generates an induced voltage, which is then rectified through the rectification circuit section 122 and adjusted to be a predetermined voltage before supplying to the IC card logic section 123.

The reader/writer device 100 is characterized by including a power control circuit 111 for controlling power supply to the antenna coil 117, a voltage detection circuit 114 for detecting an input voltage of the antenna coil 117, and first and second tables stored in the reader/writer IC 115.

The first table is to derive a coupling coefficient k from an output voltage Vs of the power control circuit 111 and an input voltage V to the antenna coil detected by the voltage detection circuit 114. This table is based on a formula V=Vs·f(k) (F is a function).

The second table is to derive an optimal (a voltage not causing excess heat) voltage Vs for the coupling coefficient k from the coupling coefficient k and an optimal received power P. This table is based on a formula P=g(Vs, k) (g is a function).

In the foregoing arrangement, the voltage detection circuit 114 detects an output voltage V (input voltage to the antenna coil 117) of the amplifier 112 at a certain timing. The detected value of the output voltage V is sent to the reader/writer IC 115. Since the reader/writer IC 115 controls the output voltage Vs of the power control circuit 111, it has already obtained the value of the output voltage Vs at this stage.

Next, the reader/writer IC 115 obtains the coupling coefficient k with reference to the first table by using the output voltage V of the amplifier 112 and the output voltage Vs of the power control circuit 111. Then, the reader/writer IC 115 obtains an optimal (a voltage not causing excess heat) output voltage Vs of the power control circuit 111 for the coupling coefficient k with reference to the second table by using the coupling coefficient k which has been obtained and the optimal received power P for the IC card.

Further, the reader/writer IC 115 controls the power control circuit 111 so that the power control circuit 111 outputs the obtained output voltage Vs. Consequently, it is possible to cut the excess power supply and prevent heat generation due to the power difference.

The foregoing IC card 101 and the reader/writer device 100 which can prevent heat generation due to the power difference of the received power however causes magnification of circuit scale and an increase of power consumption because of provision of the power control circuit 111 and the voltage detection circuit 114.

Further, the IC card 101 and the reader/writer device 100 still require an increase of power supply when extending the communication distance. Therefore, the problem of adverse effect to the other devices due to an increase of power supply still cannot be solved.

SUMMARY OF THE INVENTION

The present invention is made in view of the foregoing conventional problems, and an object is to provide a non-contact power supply system having a simple structure and capable of reducing heat generation due to difference in received power. Further, another object of the present invention is to provide a non-contact power supply system capable of extending an allowable operation distance between a semiconductor device and a power supply device without increasing power supply from the power supply device.

In order to solve the foregoing problems, in an electromagnetic coupling characteristic adjustment method of the present invention for adjusting an electromagnetic coupling characteristic between a power supply device and a semiconductor device which are used in a non-contact power supply system in which a power transmission antenna coil provided in the power supply device and a power receiving antenna coil provided in the semiconductor device are electromagnetically coupled so that the power supply device supplies power to the semiconductor device without contact with the semiconductor device, the power supply device includes a first adjustment impedance element connected in series to the power transmission antenna coil and a second adjustment impedance element connected in parallel with the power transmission antenna coil. The electromagnetic coupling characteristic adjustment method comprising the step of: (a) determining impedances of the first and second adjustment impedance elements so that the semiconductor device receives greatest power when a power supply distance, which is a distance between the power transmission antenna coil and the power receiving antenna coil, has a predetermined value not less than 0.

Here, the predetermined value of the power supply distance is preferably in the vicinity of a likely power supply distance used for the system. For example, a non-contact communication system, where the semiconductor device is an IC card and the power supply device is a reader/writer device, falls into a close-type, an adjacent-type, a proximity-type, according to a communication distance between the IC card and the reader/writer device. These different types are in progress for standardization as ISO10536, ISO/IEC14443, and ISO/IEC15693, with likely communication distances of 1 mm (millimeter), around 100 mm, and around 700 mm, respectively. Therefore, the predetermined value of power supply distance is preferably around 1 mm in a close-type, around 100 mm in an adjacent-type, and around 700 mm in a proximity type, in case of a non-contact communication system. Further, the predetermined value of communication distance is more preferably in the vicinity of 30 mm, specifically in a range between 20 mm to 40 mm, which is most likely communication distance used for the adjacent-type IC card.

With the foregoing arrangement, the impedances of the first and second impedance adjustment elements in the power supply device are determined so that the semiconductor device receives greatest power at a predetermined value of communication distance. Incidentally, in a general function y=f(x), variation quantity of the dependent variable y is small in the vicinity of the local maximum and the local minimum. Further, when the dependent variable y includes the local maximum or the local minimum in its range, the dependent variable increases and also decreases, and the range becomes smaller. Namely, for a variable varies in a predetermined range, a variable including the local maximum or the local minimum generally has a smaller range of dependent variable than a variable monotonically increases or monotonically decreases.

Accordingly, in the electromagnetic coupling characteristic adjustment method in a non-contact power supply system according to the present invention, variation of the received power due to difference of power supply distance can be reduced, compared to a conventional method in which the received power becomes maximum when a power supply distance is 0, and then monotonically decreases as the power supply distance increases. On this account, heat generation due to the difference of received power can be reduced with a simple structure only provided with the first and second adjustment impedance elements.

Further, when the power supply distance from the power supply device is extended while enabling operation of the semiconductor device, the foregoing structure allows such extension with a smaller difference between the extended power supply distance and a power supply distance where the received power becomes maximum, thus offering greater received power at the extended power supply distance than the conventional system. Consequently, it is possible to extend the power supply distance without increasing power supply.

Further, in an electromagnetic coupling characteristic adjustment method of the present invention for adjusting an electromagnetic coupling characteristic between a power supply device and a semiconductor device which are used in a non-contact power supply system in which a power transmission antenna coil provided in the power supply device and a power receiving antenna coil provided in the semiconductor device are electromagnetically coupled so that the power supply device supplies power to the semiconductor device without contact with the semiconductor device, the power supply device includes a first adjustment impedance element connected in series to the power transmission antenna coil and a second adjustment impedance element connected in parallel with the power transmission antenna coil, the electromagnetic coupling characteristic adjustment method comprising the step of: (a) determining impedances of the first and second adjustment impedance elements so that the semiconductor device receives greater power than a minimum power for operation of the semiconductor device when a power supply distance, which is a distance between the power transmission antenna coil and the power receiving antenna coil, is within a predetermined range.

With the foregoing arrangement, the impedances of the first and second adjustment impedance elements are determined so that the semiconductor device receives greater power than a minimum power for operation of the semiconductor device when a power supply distance is within a predetermined range. Also, in this case, the difference of received power due to variation of power supply distance can be reduced compared to the conventional method, thus reducing heat generation due to the difference of received power with a simple structure only provided with the first and second adjustment impedance elements.

Further, a power supply device of the present invention including a power transmission antenna coil which is electromagnetically coupled with a power receiving antenna coil provided in a semiconductor device so as to supply power to the semiconductor device without contact with the semiconductor device, includes: a first adjustment impedance element connected in series to the power transmission antenna coil; and a second adjustment impedance element connected in parallel with the power transmission antenna coil, impedances of the first and second adjustment impedance elements being determined so that the semiconductor device receives greatest power when a power supply distance, which is a distance between the power transmission antenna coil and the power receiving antenna coil, is within a predetermined range whose lower limit is greater than 0.

With the foregoing arrangement, the first and second adjustment impedance elements are determined so that the semiconductor device receives greatest power at a power supply distance of greater than 0. Thus, as described, the difference of received power due to variation of power supply distance can be reduced compared to the conventional method, thus reducing heat generation due to the difference of received power with a simple structure only provided with the first and second adjustment impedance elements.

Further, when the power supply distance from the power supply device is extended while enabling operation of the semiconductor device, the foregoing structure allows such extension with a smaller difference between the extended power supply distance and a power supply distance where the received power becomes maximum, thus offering greater received power at the extended power supply distance than the conventional system. Consequently, it is possible to extend the power supply distance without increasing power supply.

Further, a non-contact power supply system according to the present invention includes a power supply device having the foregoing structure and a semiconductor device having a power receiving antenna coil which is electromagnetically coupled with a power transmission antenna coil of the power supply device.

Since this non-contact power supply system is made up of the foregoing power supply device, the same effect can be obtained.

Additional objects, features, and strengths of the present invention will be made clear by the description below. Further, the advantages of the present invention will be evident from the following explanation in reference to the drawings.

DESCRIPTION OF THE EMBODIMENTS

Figure 1:
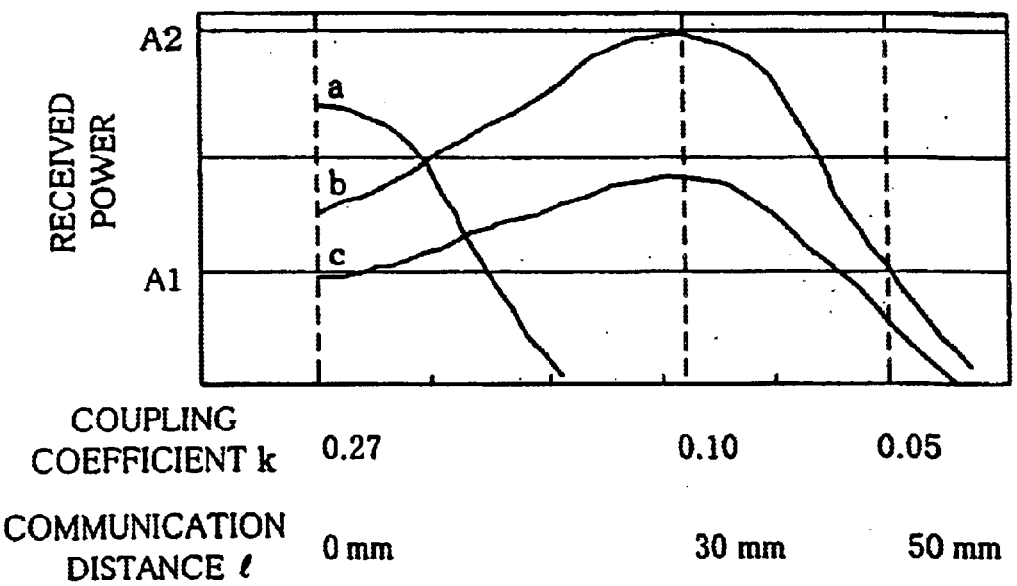
FIG. 1 is a graph showing characteristic of received power by an IC card) of a non-contact communication system, and a curved line a shows characteristic of conventional received power as a comparative example, a curved line b shows characteristic of received power in a non-contact communication system according to one embodiment of the present invention, and a curved line c shows characteristic of received power by an IC card without guarantee for operation in close-contact state.

One embodiment of the present invention will be described below with reference to FIGS. 1 through 6. FIG. 3 shows an arrangement example of a circuit for a non-contact IC card system used in the present embodiment. In the figure, the left side of the broken line shows an arrangement example of a reader/writer device (power supply device) 1 and the right side shows an arrangement example of an IC card (semiconductor device) 2.

The reader/writer device 1 includes an oscillator (power supplying section) 10, an amplifier (power supplying section) 11, adjustment capacitors 12 and 13, and an antenna coil 14. The oscillator 10 outputs a high frequency wave, which is then amplified through the amplifier 11 so as to be supplied to the antenna coil 14. In the present embodiment, the antenna coil 14 is connected in series to the adjustment capacitor (first adjustment impedance element) 12, and also connected in parallel with the adjustment capacitor (second adjustment impedance element) 13.

The IC card 2 includes an antenna coil 20, a tuning capacitor 21, a rectification circuit section 22, and an IC card logic section 23. The tuning capacitor 21 is connected in parallel with the antenna coil 20 so as to increase transmission efficiency sympathetically with a self-inductance L2 of the antenna coil 20. Electromagnetic coupling of the antenna coil 20 of the IC card 2 and the antenna coil 14 of the reader/writer device 1 generates an induced voltage, which is then rectified through the rectification circuit section 22 and adjusted to be a predetermined voltage before supplying to the IC card logic section 23.

The non-contact IC card system of the present embodiment is an adjacent-type with a communication distance of from 0 mm to 50 mm. The following will explain a calculation method of an electromagnetic coupling characteristic between the antenna coil 14 of the reader/writer device 1 and the antenna coil 20 of the IC card 2. Note that, since the electromagnetic coupling characteristic changes depending on the shapes of the antenna coils 14 and 20, it is assumed in the following explanation that the shapes of those are fixed.

The present embodiment uses the following procedures so as to increase the communication distance from 0 mm to 50 mm.

(1) Find a coupling coefficient k according to the communication distance (2) Find capacitances CA and CB of the adjustment capacitors 12 and 13 so that the communication distance causing the maximum power receiving exists within a predetermined range of communication distance.

(3) Determine an output voltage V0 of the reader/writer device so as to constantly offering the minimum power consumption for driving the IC card with a communication distance within the predetermined range.

As described above, the coupling coefficient k changes depending on geometric arrangement of the antennal coil 14 with respect to the antenna coil 20, and therefore the coupling coefficient k can be found out by simulation or the like. Further, since the shapes of the antenna coils 14 and 20 are fixed, the coupling coefficient k depends on a communication distance l.

Figure 6:
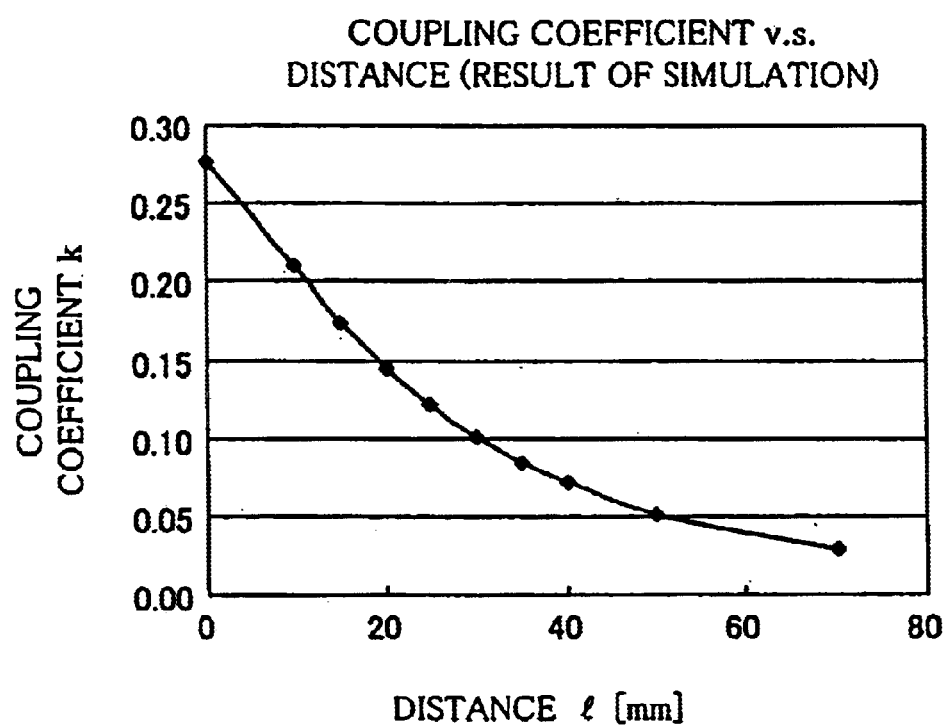
FIG. 6 is a graph showing a relation between coupling coefficient and communication distance in the non-contact communication system shown in FIG. 3.
Figure 7:
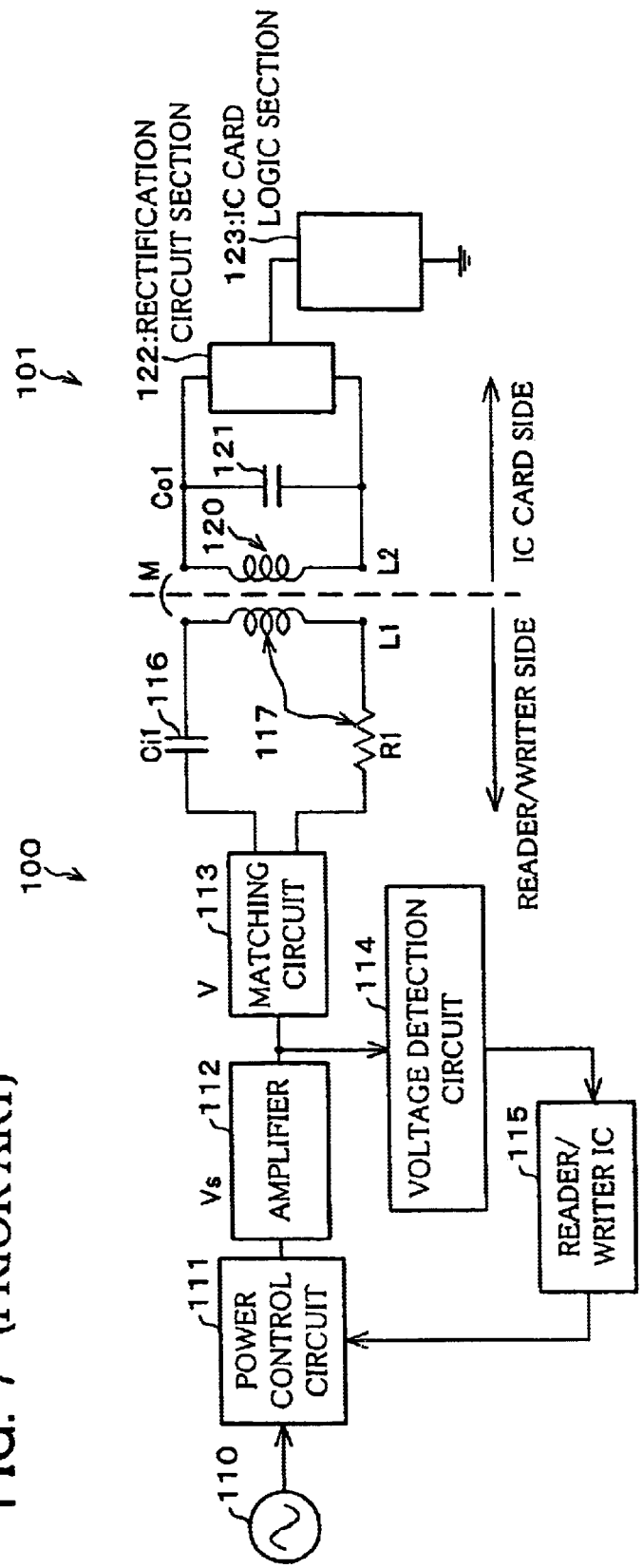
FIG. 7 is a block diagram showing a schematic arrangement of a conventional non-contact communication system.
Figure 8:
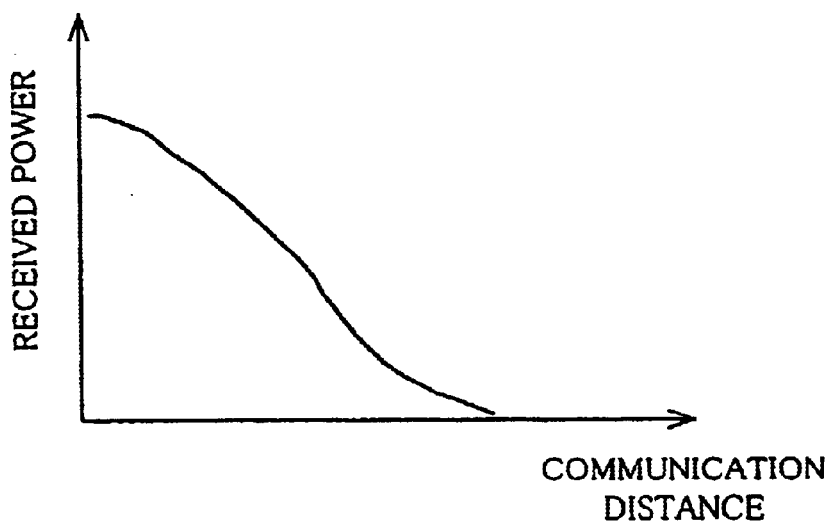
FIG. 8 is a graph showing a relation between received power and communication distance in the non-contact communication system shown in FIG. 7.
Figure 9:
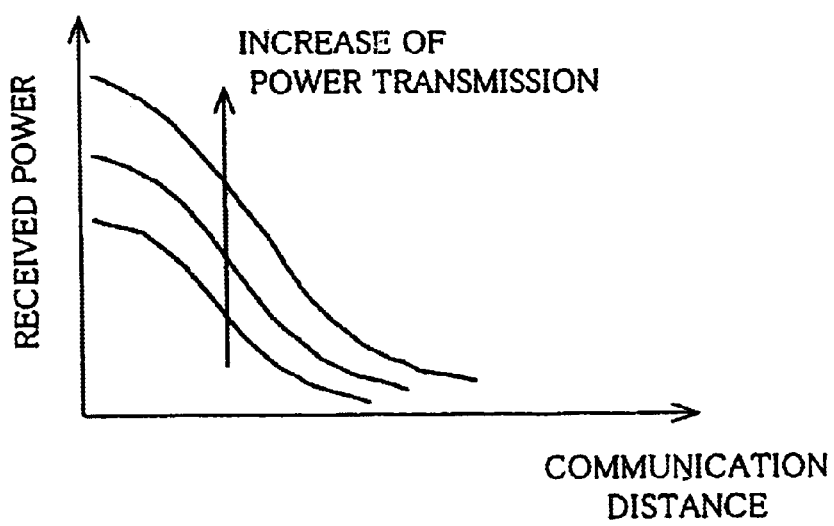
FIG. 9 is a graph similar to that shown in FIG. 8 and showing a relation between received power and communication distance when more power is supplied.

FIG. 6 shows a relation between the coupling coefficient k and the communication distance l. With reference to the figure, the coupling coefficient k is a function monotonically decreases with respect to the communication distance l, i.e., the coupling coefficient k is uniquely fixed with respect to the communication distance l. Accordingly, when the communication distance l is determined, the range of the coupling coefficient k is uniquely fixed.

In FIG. 6, the coupling coefficient k is in a range from 0.05 to 0.27 when the communication distance l is in a range from 0 mm to 50 mm. Then, the capacitances CA and CB are determined so that the power receiving becomes maximum when the coupling coefficient k is within the foregoing range. This calculation uses an electromagnetic coupling equivalent circuit shown in FIG. 4, which corresponds to the system arrangement of the present embodiment.

Figure 4:
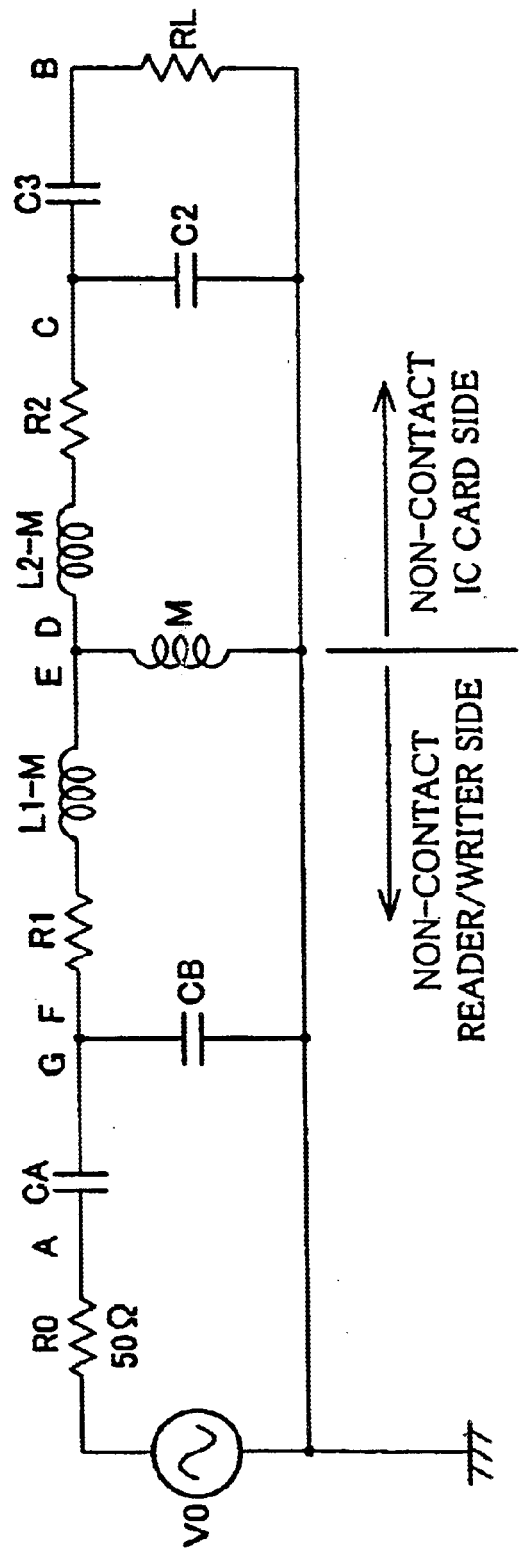
FIG. 4 is an equivalent circuit diagram of the non-contact communication system shown in FIG. 3.
Figure 5:
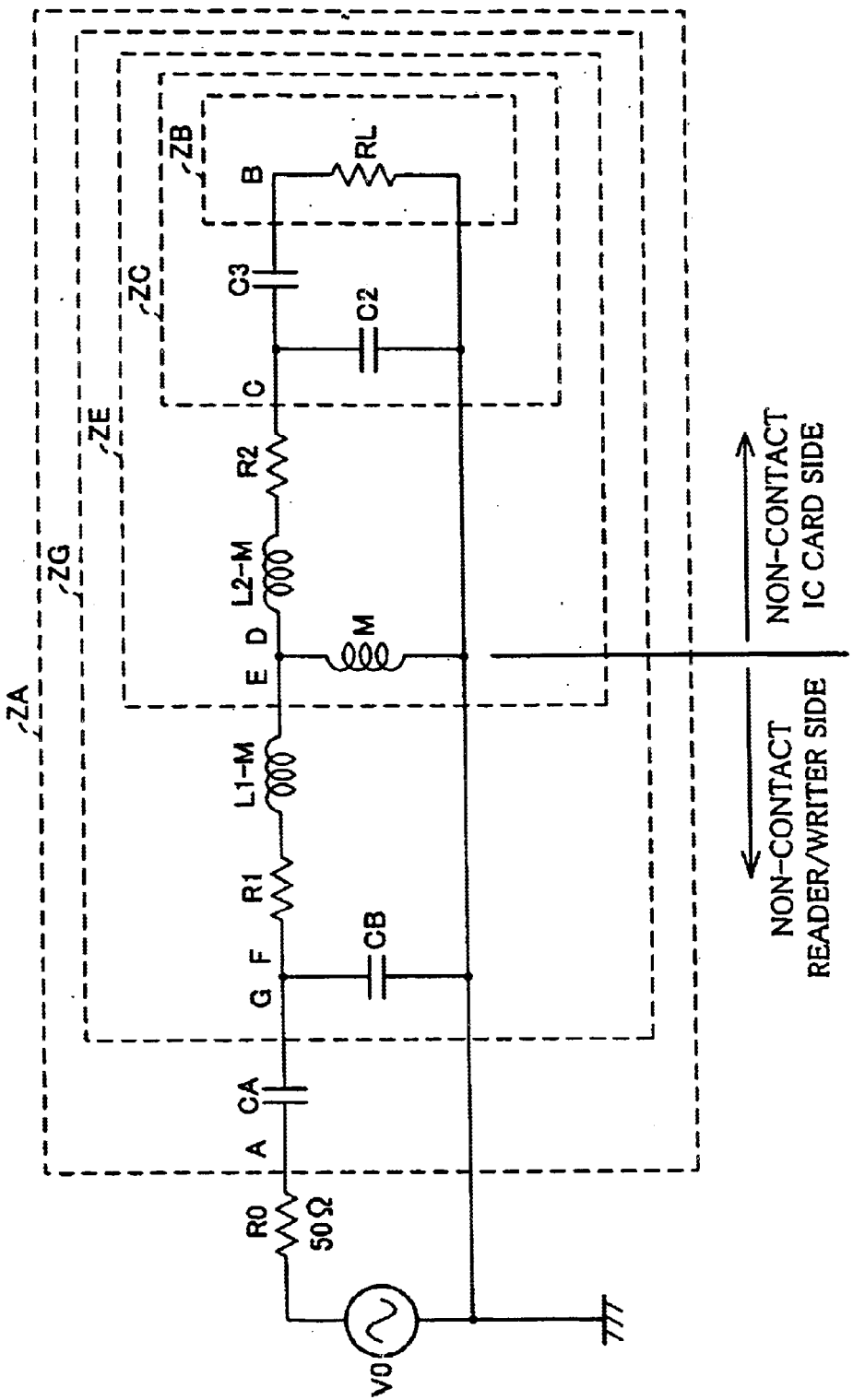
FIG. 5 is the same equivalent circuit as that of FIG. 4, additionally having broken lines for showing impedances from an internal resistance of the IC card to some different points.

FIGS. 4 and 5 show an electromagnetic coupling equivalent circuit for the reader/writer device 1 and the IC card 2. The following will explain respective components for constituting the circuit. A resistance RL is a maximum load resistance of a semiconductor device included in the IC card 2, and the resistance value thereof is found according to an operation current value of the semiconductor device used for the IC card 2. The resistance RL is supplied with a voltage VB in its both ends. The voltage VB is generated by power received in the IC card 2 upon electromagnetic coupling of the reader/writer device 1 and the IC card 2.

A capacitor C2 is provided as a capacitance of the tuning capacitor 21 connected in parallel with the antenna coil 20, and a capacitor C3 is an internal capacitance of the chip in this example, which is however not necessarily provided inside the chip. In the present embodiment, it is not necessary to change the coil constant of the antenna coil 20 of the IC card 2, and therefore, the value of the capacitor C2 is appropriately determined according to the coil constant mounted in the IC card 2.

The resistance R2 is a loss resistance of the antenna coil 20, and an inductance L2 is a self inductance of the antenna coil 20. The resistance R2 and the inductance L2–M are determined as specific values according to the coil constant, for the same reason above.

The inductance M is a mutual inductance of the antenna coils 14 and 20, and the relation between the coupling coefficient k and the mutual inductance M is generally expressed by the following equations.

$$k = M/(L1 \times L2)^{+e,fra} \; 1/2 + ee \quad \text{(a)}$$

That is, $$M = k(L1 * L2)^{+e,fra} \; 1/2 + ee \quad \text{(a')}$$

The inductance L1 is a self inductance of the antenna coil 14 of the reader/writer device 1, and the resistance R1 is a loss resistance of the antenna coil 14. The resistance R1 and the inductance L1–M are determined as specific values according to the coil constant, for the same reason above.

Therefore, in the present embodiment, the capacitances CA and CB of the adjustment capacitors 12 and 13, and the coupling coefficient k operate as variation parameters for the received power PB supplied to the resistance RL, i.e., the received power of the IC card 2.

Note that, the output resistance R0 of the amplifier 11 of the reader/writer device 1 is determined as 50 Ω. It should be noted that the same calculation can be used when the output resistance R0 is an impedance with an imaginary component (R+jX).

The schematic view of FIG. 5 includes points A, G, E, C, and B, and respective impedance from those points toward the IC card side are described as ZA, ZG, ZE, ZC and ZB.

When the coil constant (L1, L2, R1, R2, C2), an IC card-side constant RL, and C3 are determined, the impedance ZA from the point A toward the IC card side can be expressed as a function denoted by the formula below in which CA, CB and k are variables (parameter) ZA=fA (CA, CB, k)—(Formula 0)

Accordingly, the function fA can be found by setting substitute values for the coil constant (L1, L2, R1, R2, C2), the IC card-side constant RL, and C3. As can be clearly understood, ZB and ZC are constants, ZE is a function with k as a variable, ZG is a function with CB and k as variables.

Next, a voltage VA at the point A is found by dividing the electromotive force V0 by R0 and ZA, which is expressed as follows.

$$VA = V0(ZA/(R0 + ZA)) \quad \text{(Formula 1)}$$

Next, a voltage VG at the point G (point F) is found by dividing the voltage VA at the point A by the impedance of CA and ZG, which is expressed as follows.

$$VG = VA(ZG/((1/jwCA) + ZG) \quad \text{(Formula 2)}$$

Next, a voltage VE at the point E (point D) is found by dividing the voltage VG at the point G (point F) by R1, an impedance of (L1–M) and ZE, which is expressed as follows.

$$VE = VG(ZE/(R1 + jw(L1 - M) + ZE) \quad \text{(Formula 3)}$$

Next, a voltage VC at the point C is found by dividing the voltage VE at the point E (point D) by R2, an impedance of (L2–M) and ZC, which is expressed as follows.

$$VC = VE(ZC/(R2 + jw(L2 - M) + ZC) \quad \text{(Formula 4)}$$

Next, a voltage VB at the point B is found by dividing the voltage VC at the point C by an impedance (1/jwC3) of C3 and RL, which is expressed as follows.

$$VB = VC(RL/((1/jwC3) + RL) \quad \text{(Formula 5)}$$

Further, a power PB at the point B is expressed as follows.

$$PB = VB^2/RL \quad \text{(Formula 6)}$$

Further, by using the coil constant (L1, L2, R1, R2, C2), the IC card-side constant RL and C3, and varying the foregoing formulas 0 through 6 and a', the formula 6 can be expressed as the following function f2 with CA, CB and k as variables.

$$PB = f2(CA, CB, k) \quad \text{(Formula 7)}$$

FIG. 1 shows a relation between communication distance and received power when the coil constants of the reader/writer side and the IC card side are determined by the foregoing adjustment. In the figure, the vertical axis shows received power of the IC card 2, the received power A1 shows power consumed by the semiconductor device for the IC card. In other words, the received power A1 shows the minimum power for driving a non-contact-type IC card. Accordingly, the IC card 2 does not start operation when the received power is less than A1.

Further, the horizontal axis shows a coupling coefficient k. As described, the coupling coefficient k is a function which monotonically decreases with respect to the communication distance l, and therefore, the communication distance l decreases as the coupling coefficient k increases. In one example shape of the antenna, it was found that l=50 mm when k=0.05, l=30 mm when k=0.10, and l=0 mm when k=0.27.

In FIG. 1, the curved line a shows characteristic of received power in a conventional system. The curved line a shows an arrangement in which the received power becomes the greatest value at the communication distance=0 mm. Thus, the received power decreases as the communication distance increases, and drops lower than the power consumption of the semiconductor device at the communication distance of 15 mm. It reveals that the maximum communication distance is approximately 15 mm.

The maximum value of the communication distance of around 50 mm can be realized by significantly increasing power supply. However, in this case, there occurs the foregoing problem of heat generation due to an excessive difference between the maximum received power at the communication distances=0 mm, and the received power A1.

Next, the variables CA and CB are changed to plot the received power characteristic, and this plotting is repeated so as to found an optimal received power characteristic. The curved line b of FIG. 1 shows received power characteristics in case where the capacitance CA=10 pF (picofarad), and the capacitance CB=60 pF.

In the curved line B, the received power becomes maximum when k=0.10, i.e., when the communication distance l=30 mm. Therefore, the IC card can be frequently used around a communication distance of 30 mm. Here, heat generation occurs by extra power (A2-A1), but the amount thereof is within a range for allowing the IC card 2 to operate without malfunction.

As described, the received power characteristic changes in the vertical direction when the output voltage V0 of the reader/writer device 1 is changed. In the curved line b of FIG. 1, the output voltage V0 of the reader/writer device 1 is adjusted so as to obtain the received power A1 at communication distances of 0 mm and of 50 mm. In other words, when the communication distance is within a range from 0 mm to 50 mm, the power supply from the oscillator 10 and the amplifier 11 to the antenna coil 14 is adjusted so that the received power becomes higher than the minimum power for driving the IC card 2.

With such adjustment, the IC card 2 can be in operation even in close-contact state with the communication distance l=0 mm. Therefore, the IC card 2 with the foregoing arrangement can be adopted for the close-type reader/writer device.

Further, since the Received power at a communication distance l=0 mm is determined to be slightly higher than power consumption of the semiconductor device of the IC card, it is possible to prevent heat generation by extra power, which may cause a trouble in operation.

Further, the received power reaches to almost A2 around the communication distance l=30 mm, thus providing sufficient margin of operation power for this case. On this account, the foregoing communication distance can be frequently used.

Further, when the communication distance exceeds 50 mm, the received power becomes lower than the minimum driving voltage. Accordingly, this distance is considered the maximum communication distance under the condition with the foregoing adjustment.

With such an arrangement, there establishes an impedance adjustment method for a non-contact card system in which received power of the IC card 2 is increased so as to increase communication distance. This method provides the maximum received power at a communication distance (30 mm) most frequently used by an adjacent-type IC card. Further, this method ensures the received power higher than the minimum driving voltage of the IC card 2 when the non-contact type reader/writer device 1 and the IC card 2 are in close-contact state (communication distance l=0 mm). On this account, the foregoing problem of heat generation can be solved while providing longer communication distance.

Further, when it is not necessary to ensure operation of the IC card 2 in the close-contact state, impedance is adjusted to have the received power characteristic shown by a curved line c of FIG. 1, so that an IC card specification can be made with a specific communication distance.

In this case, it is arranged that the received power becomes lower than A1 at the communication distance=0, and the upper limit of communication distance is approximately 45 mm.

Figure 2:
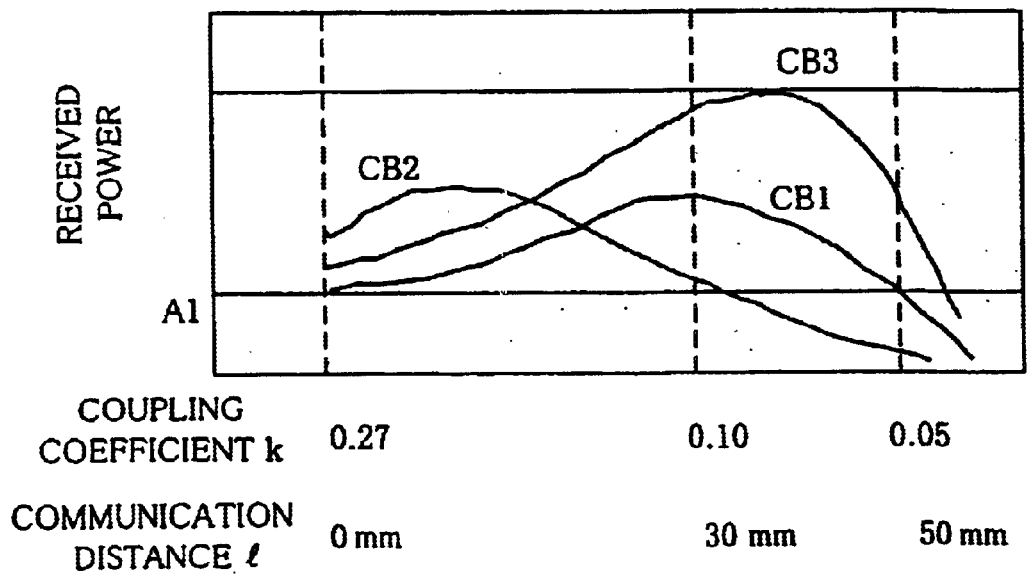
FIG. 2 is a graph showing characteristic of received power by a reader/writer device of the present embodiment on condition that an adjustment capacitor connected in series to an antenna coil has a fixed capacitance, and the capacitance of an adjustment capacitor connected in parallel with the antenna coil has three variations: CB1, CB2, and CB3 (CB1:CB2:CB3=8:13:9).
Figure 3:
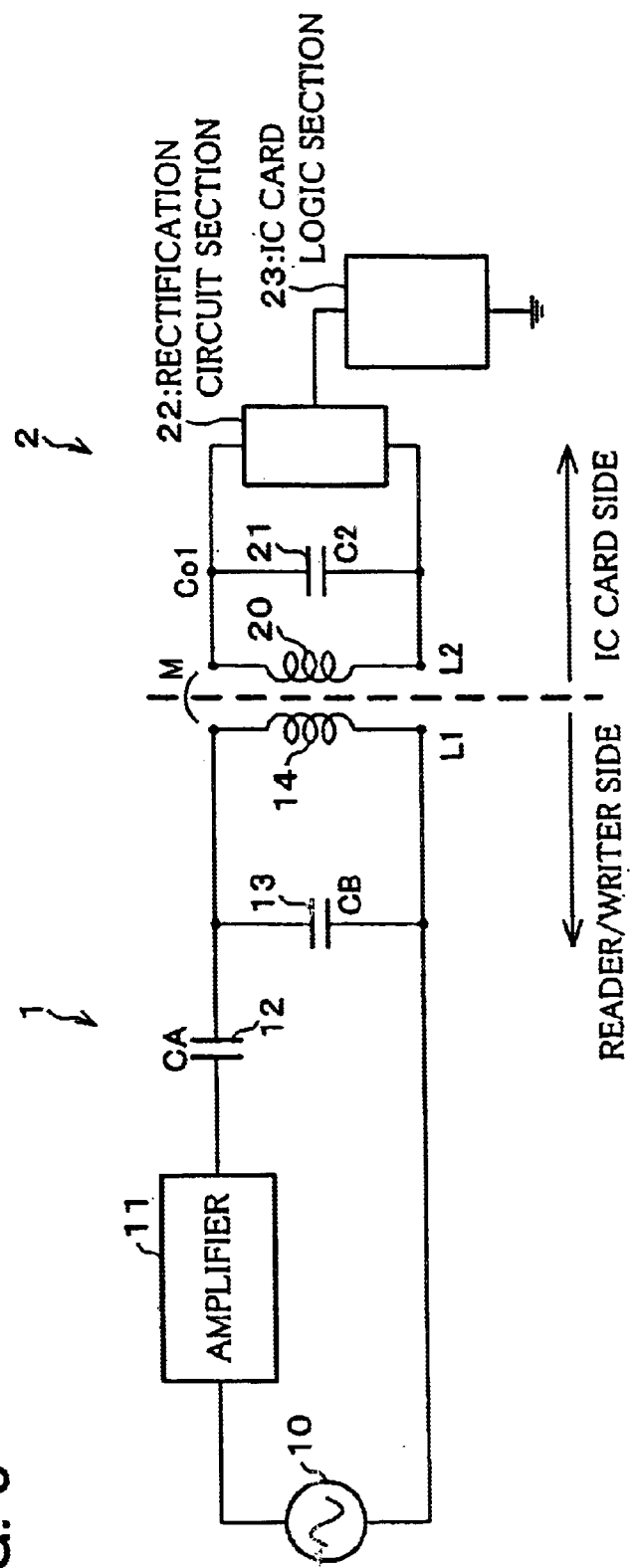
FIG. 3 is a block diagram showing a schematic arrangement of a non-contact communication system according to the present embodiment.

Further, FIG. 2 shows a received power characteristic in the case where the capacitance CA is fixed to a certain value, and the capacitance CB is changed to CB1, CB2, and CB3 (CB1:CB2:CB3=8:13:9).

As can be seen in FIG. 2, the coupling coefficient k i.e., the communication distance l for the maximum received power changes depending on the capacitance CB.

When CB is determined as CB1, the received power becomes maximum with gentle curve where k=0.15. Though this characteristic is relatively desirable, the system can be vulnerable to disturbance such as a noise etc., since such a characteristic cannot ensure electric power margin.

When CB is determined as CB2, the received power becomes maximum where k=0.25 (in the vicinity of the communication distance l=10 mm). In this characteristic, the IC card 2 receives maximum power near the reader/writer device 1, thus attaining a limited, though significant increase in the communication distance.

When CB is determined as CB3, the received power becomes maximum where k=0.08 (in the vicinity of the communication distance=40 mm). In this characteristic, the sufficient power for driving is ensured around the communication distance of 50 mm, and the received power becomes maximum at a distance most frequently used by the IC card 2. Accordingly, this example succeeds in obtaining a desirable characteristic.

As described, it is possible to provide an IC card compatible with different operation communication distance specifications by adjusting CA and CB.

Note that, the present invention is not limited to the foregoing embodiment above, but rather may be applied in many variations within the spirit of the present invention, provided such variations do not exceed the scope of the patent claims set forth below.

For example, the adjustment of the peak value of the received power characteristic may depend on the specification of power consumption of a semiconductor device used for the IC card 2, and the specification of communication distance of the non-contact IC card system.

Further, the example of FIG. 2 adjusts impedance by fixing the capacitance CA of the adjustment capacitor 12 and changing the capacitance CB of the adjustment capacitor 13; however, the adjustment of impedance may also be performed by fixing the capacitance CB and changing the capacitance CA, or by changing both the capacitances CA and CB.

Further, there may be some alternatives, such as provision of a circuit for automatically adjusting the capacitances CA and CB so as to automatically adjust impedance by using information of the initial response of non-contact communication. Such automatic adjustments may allow compatibility with other types of IC card having different usage modes.

Further, though the present embodiment describes a non-contact IC card system with the reader/writer device 1 including the adjustment capacitors 12 and 13, the present invention may also be adopted for a non-contact IC card system using a reader/writer device 1 including other impedance element than the adjustment capacitors 12 and 13, for example, a coil or the like.

Further, though the foregoing embodiment describes an IC card system using the IC card 2 and the reader/writer device 1, the present invention may be adopted for the whole of RF communication by electromagnetic induction, such as a non-contact tag.

Further, the foregoing embodiment describes an example of performing data communication between the reader/writer device supplying power and the IC card receiving the power; however, the present invention may also be adopted for a power supply system from a power supply device to a semiconductor device without performing communication.

As described, in an electromagnetic coupling characteristic adjustment method according to the present invention for adjusting an electromagnetic coupling characteristic between a power supply device and a semiconductor device which are used in a non-contact power supply system in which a power transmission antenna coil provided in the power supply device and a power receiving antenna coil provided in the semiconductor device are electromagnetically coupled so that the power supply device supplies power to the semiconductor device without contact with the semiconductor device, the power supply device includes a first adjustment impedance element connected in series to the power transmission antenna coil and a second adjustment impedance element connected in parallel with the power transmission antenna coil, the electromagnetic coupling characteristic adjustment method comprising the step of: (a) determining impedances of the first and second adjustment impedance elements so that the semiconductor device receives greatest power when a power supply distance, which is a distance between the power transmission antenna coil and the power receiving antenna coil, has a predetermined value not less than 0.

Thus, the difference of received power due to variation of power supply distance can be reduced compared to the conventional method, thus reducing heat generation due to the difference of received power with a simple structure only provided with the first and second adjustment impedance elements. Further, when the power supply distance from the power supply device is extended while enabling operation of the semiconductor device, it is possible in this method to obtain greater received power in the extended distance than that of the conventional method, thus allowing extension of distance without increasing power supply.

Consequently, it is possible to extend the power supply distance without increasing power supply.

Further, the electromagnetic coupling characteristic adjustment method of the present invention in a non-contact power supply system as set forth in claim 1 is arranged so that the step (a) includes the sub-steps of: determining a relation between (i) an electromagnetic coupling coefficient for the power transmission antenna coil and the power receiving antenna coil, and (ii) the power supply distance; and determining impedances of the first and second adjustment impedance elements so that the semiconductor device receives the greatest power when an electromagnetic coupling coefficient becomes a value corresponding to the predetermined value of the power supply distance.

An electromagnetic coupling coefficient depends on geometric arrangement of the respective antenna coils. Therefore, the power supply distance may correspond to the electromagnetic coupling coefficient. Further, the relation between the electromagnetic coupling coefficient and the received power can be easily found by using an equivalent circuit diagram.

Accordingly, with the foregoing method, impedance of the adjustment impedance element can be easily determined by finding the relation between the electromagnetic coupling coefficient and the power supply distance.

Further, as described, the electromagnetic coupling characteristic adjustment method of the present invention in a non-contact power supply system further includes the step of: (b) determining power supplied from the power supply device so that the semiconductor device receives greater power than a minimum power for operation of the semiconductor device when the power supply distance is within a predetermined range.

Here, the predetermined range of power supply distance is preferably equal to a range of power supply distance likely used for the system. For example, in a non-contact communication system where the semiconductor device is an IC card and the power supply device is a reader/writer device, the preferable range is not more than 5 mm for the close-type, not more than 100 mm for the adjacent-type, and not more than 700 mm for the proximity-type.

In the conventional method, the lower limit of power supply distance is fixed as 0, and therefore an increase of power supply only causes an increase of the upper limit of the range of power supply distance. On the other hand, since the received power becomes maximum at a power supply distance of greater than 0 in the present invention, an increase of power supply causes an increase of the upper limit of the range of power supply distance and also causes a decrease of the lower limit of the range. Therefore, the foregoing method allows a larger increase of the range of power supply distance than the conventional method with a small increase of power supply, thus easily finding a specific power supply value causing the semiconductor device to receive greater power than a minimum power for operation of the semiconductor device when the power supply distance is within a predetermined range.

Further, as described, in an electromagnetic coupling characteristic adjustment method of the present invention for adjusting an electromagnetic coupling characteristic between a power supply device and a semiconductor device which are used in a non-contact power supply system in which a power transmission antenna coil provided in the power supply device and a power receiving antenna coil provided in the semiconductor device are electromagnetically coupled so that the power supply device supplies power to the semiconductor device without contact with the semiconductor device, the power supply device includes a first adjustment impedance element connected in series to the power transmission antenna coil and a second adjustment impedance element connected in parallel with the power transmission antenna coil. The electromagnetic coupling characteristic adjustment method comprising the step of: (a) determining impedances of the first and second adjustment impedance elements so that the semiconductor device receives greater power than a minimum power for operation of the semiconductor device when a power supply distance, which is a distance between the power transmission antenna coil and the power receiving antenna coil, is within a predetermined range.

Thus, the difference of received power due to variation of power supply distance can be reduced compared to the conventional method, thus reducing heat generation due to the difference of received power with a simple structure only provided with the first and second adjustment impedance elements.

Further, as described, the electromagnetic coupling characteristic adjustment method of the present invention in a non-contact power supply system is arranged so that the step (a) includes the sub-steps of: determining a relation between (i) an electromagnetic coupling coefficient for the power transmission antenna coil and the power receiving antenna coil, and (ii) the power supply distance; and determining impedances of the first and second adjustment impedance elements so that the semiconductor device receives the greater power than a minimum power for operation of the semiconductor device when an electromagnetic coupling coefficient becomes a value corresponding to the predetermined range of the power supply distance.

Accordingly, with the foregoing method, impedance of the adjustment impedance element can be easily determined by finding the relation between the electromagnetic coupling coefficient and the power supply distance.

In the foregoing arrangement, it is preferable that the first and second adjustment impedance elements are capacitors.

Further, as described, the power supply device includes a first adjustment impedance element connected in series to the power transmission antenna coil and a second adjustment impedance element connected in parallel with the power transmission antenna coil. The impedances of the first and second adjustment impedance elements are determined so that the semiconductor device receives greatest power when the power supply distance is within a predetermined range whose lower limit is greater than 0.

Thus, the difference of received power due to variation of power supply distance can be reduced compared to the conventional method, thus reducing heat generation due to the difference of received power with a simple structure only provided with the first and second adjustment impedance elements. Further, when the power supply distance from the power supply device is extended while enabling operation of the semiconductor device, the foregoing structure allows such extension with a smaller difference between the extended power supply distance and a power supply distance where the received power becomes maximum, thus offering greater received power at the extended power supply distance than the conventional system. Consequently, it is possible to extend the power supply distance without increasing power supply.

Further, as described, the foregoing power supply device of the present invention is arranged so that power supplied to the power transmission antenna coil is determined so that the semiconductor device receives greater power than a minimum power for operation of the semiconductor device when the power supply distance is within the predetermined range.

The foregoing method allows a larger increase of the range of power supply distance than the conventional method with a small increase of power supply, thus easily finding a specific power supply value causing the semiconductor device to receive greater power than a minimum power for operation of the semiconductor device when the power supply distance is within a predetermined range.

In the foregoing arrangement, it is preferable that the first and second adjustment impedance elements are capacitors.

Further, a non-contact power supply system according to the present invention includes a power supply device having the foregoing structure and a semiconductor device having a power receiving antenna coil which is electromagnetically coupled with a power transmission antenna coil of the power supply device.

On this account, this non-contact power supply system offers the same effect as above.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An electromagnetic coupling characteristic adjustment method for adjusting an electromagnetic coupling characteristic between a power supply device and a semiconductor device which are used in a non-contact power supply system in which a power transmission antenna coil provided in the power supply device and a power receiving antenna coil provided in the semiconductor device are electromagnetically coupled so that the power supply device supplies power to the semiconductor device without contact with the semiconductor device, the power supply device including a first adjustment impedance element connected in series to the power transmission antenna coil and a second adjustment impedance element connected in parallel with the power transmission antenna coil, the electromagnetic coupling characteristic adjustment method comprising the step of:

(a) determining impedances of the first and second adjustment impedance elements so that the semiconductor device receives greatest power when a power supply distance, which is a distance between the power transmission antenna coil and the power receiving antenna coil, has a predetermined value not less than 0.

2. The electromagnetic coupling characteristic adjustment method in a non-contact power supply system as set forth in claim 1, wherein, the step (a) includes the sub-steps of:

determining a relation between (i) an electromagnetic coupling coefficient for the power transmission antenna coil and the power receiving antenna coil, and (ii) the power supply distance; and determining impedances of the first and second adjustment impedance elements so that the semiconductor device receives the greatest power when an electromagnetic coupling coefficient becomes a value corresponding to the predetermined value of the power supply distance.

3. The electromagnetic coupling characteristic adjustment method in a non-contact power supply system as set forth in claim 1, further comprising the step of:

(b) determining power supplied from the power supply device so that the semiconductor device receives greater power than a minimum power for operation of the semiconductor device when the power supply distance is within a predetermined range.

4. The electromagnetic coupling characteristic adjustment method in a non-contact power supply system as set forth in claim 1, wherein:

the first and second adjustment impedance elements are capacitors.

5. The electromagnetic coupling characteristic adjustment method in a non-contact power supply system as set forth in claim 4, wherein:

the step (a) is performed to determine capacitances of the first and second adjustment impedance elements so that the semiconductor device receives the greatest power when the power supply distance has the predetermined value not less than 0.

6. The electromagnetic coupling characteristic adjustment method in a non-contact power supply system as set forth in claim 1, wherein:

the predetermined value is in a range from 20 mm to 40 mm.

7. The electromagnetic coupling characteristic adjustment method in a non-contact power supply system as set forth in claim 1, wherein:

the semiconductor device is an IC card.

8. An electromagnetic coupling characteristic adjustment method for adjusting an electromagnetic coupling characteristic between a power supply device and a semiconductor device which are used in a non-contact power supply system in which a power transmission antenna coil provided in the power supply device and a power receiving antenna coil provided in the semiconductor device are electromagnetically coupled so that the power supply device supplies power to the semiconductor device without contact with the semiconductor device, the power supply device including a first adjustment impedance element connected in series to the power transmission antenna coil and a second adjustment impedance element connected in parallel with the power transmission antenna coil, the electromagnetic coupling characteristic adjustment method comprising the step of:

(a) determining impedances of the first and second adjustment impedance elements so that the semiconductor device receives greater power than a minimum power for operation of the semiconductor device when a power supply distance, which is a distance between the power transmission antenna coil and the power receiving antenna coil, is within a predetermined range.

9. The electromagnetic coupling characteristic adjustment method in a non-contact power supply system as set forth in claim 8, wherein, the step (a) includes the sub-steps of:

determining a relation between (i) an electromagnetic coupling coefficient for the power transmission antenna coil and the power receiving antenna coil, and (ii) the power supply distance; and determining impedances of the first and second adjustment impedance elements so that the semiconductor device receives the greater power than a minimum power for operation of the semiconductor device when an electromagnetic coupling coefficient becomes a value corresponding to the predetermined range of the power supply distance.

10. The electromagnetic coupling characteristic adjustment method in a non-contact power supply system as set forth in claim 8, wherein:

the first and second adjustment impedance elements are capacitors.

11. The electromagnetic coupling characteristic adjustment method in a non-contact power supply system as set forth in claim 10, wherein:

the step (a) is performed to determine capacitances of the first and second adjustment impedance elements so that the semiconductor device receives the greater power than a minimum power for operation of the semiconductor device when the power supply distance is within a predetermined range.

12. The electromagnetic coupling characteristic adjustment method in a non-contact power supply system as set forth in claim 8, wherein:

the predetermined range has a lower limit of 0.

13. The electromagnetic coupling characteristic adjustment method in a non-contact power supply system as set forth in claim 8, wherein:

the predetermined range has a lower limit greater than 0.

14. The electromagnetic coupling characteristic adjustment method in a non-contact power supply system as set forth in claim 8, wherein:

the semiconductor device is an IC card.

15. A power supply device including a power transmission antenna coil which is electromagnetically coupled with a power receiving antenna coil provided in a semiconductor device so as to supply power to the semiconductor device without contact with the semiconductor device, comprising:

a first adjustment impedance element connected in series to the power transmission antenna coil; and a second adjustment impedance element connected in parallel with the power transmission antenna coil, impedances of the first and second adjustment impedance elements being determined so that the semiconductor device receives greatest power when a power supply distance, which is a distance between the power transmission antenna coil and the power receiving antenna coil, is within a predetermined range whose lower limit is greater than 0.

16. The power supply device as set forth in claim 15, further comprising:

a power supply section for supplying power to the power transmission antenna coil, the power supplied to the power transmission antenna coil is determined so that the semiconductor device receives greater power than a minimum power for operation of the semiconductor device when the power supply distance is within the predetermined range.

17. The power supply device as set forth in claim 15, wherein:

the first and second adjustment impedance elements are capacitors.

18. The power supply device as set forth in claim 17, wherein:

impedances of the first and second adjustment impedance elements are determined so that the semiconductor device receives the greatest power when the power supply distance is within a predetermined range whose lower limit is greater than 0.

19. A non-contact power supply system including a power supply device and a semiconductor device having a power receiving antenna coil which is electromagnetically coupled with a power transmission antenna coil of the power supply device so as to supply power from the power supply device to the semiconductor device without contact therebetween, the power supply device including a first adjustment impedance element connected in series to the power transmission antenna coil and a second adjustment impedance element connected in parallel with the power transmission antenna coil, impedances of the first and second adjustment impedance elements being determined so that the semiconductor device receives greatest power when a power supply distance, which is a distance between the power transmission antenna coil and the power receiving antenna coil, is within a predetermined range whose lower limit is greater than 0.

20. The non-contact power supply system as set forth in claim 19, wherein:

the first and second adjustment impedance elements are capacitors.

21. The non-contact power supply system as set forth in claim 20, wherein:

capacitances of the first and second adjustment impedance elements are determined so that the semiconductor device receives the greatest power when the power supply distance is within the predetermined range.

22. The non-contact power supply system as set forth in claim 19, wherein:

the semiconductor device is an IC card.

* * * * *

UNITED STATES PATENT AND TRADEMARK OFFICE
CERTIFICATE OF CORRECTION

PATENT NO.   : 6,889,905 B2
DATED         : May 10, 2005
INVENTOR(S)  : Haruhiko Shigemasa et al.

It is certified that error appears in the above-identified patent and that said Letters Patent is hereby corrected as shown below:

<u>Column 9,</u>
Lines 9-12, should read -- $k = M/(L1 \times L2)^{1/2}$ -------(a)
That is,
$M = k(L1 * L2)^{1/2}$ -------(a') --.

Signed and Sealed this

Twenty-fourth Day of January, 2006

JON W. DUDAS
*Director of the United States Patent and Trademark Office*